(12) United States Patent
Yang et al.

(10) Patent No.: US 12,158,391 B2
(45) Date of Patent: Dec. 3, 2024

(54) SIMULATION EXPERIMENTAL TEST SYSTEM FOR TURBINE BLADE THERMAL BARRIER COATING WORKING CONDITION

(71) Applicant: XIANGTAN UNIVERSITY, Hunan (CN)

(72) Inventors: Li Yang, Hunan (CN); Yichun Zhou, Hunan (CN); Zhiyuan Liu, Hunan (CN); Wang Zhu, Hunan (CN)

(73) Assignee: XIANGTAN UNIVERSITY, Hunan (CN)

( * ) Notice: Subject to any disclaimer, the term of this patent is extended or adjusted under 35 U.S.C. 154(b) by 168 days.

(21) Appl. No.: 17/261,582

(22) PCT Filed: Dec. 6, 2019

(86) PCT No.: PCT/CN2019/123637
§ 371 (c)(1),
(2) Date: Jan. 20, 2021

(87) PCT Pub. No.: WO2020/119599
PCT Pub. Date: Jun. 18, 2020

(65) Prior Publication Data
US 2021/0341357 A1   Nov. 4, 2021

(30) Foreign Application Priority Data
Dec. 10, 2018 (CN) .......................... 201811505735.4

(51) Int. Cl.
*G01M 15/14* (2006.01)
*F01D 5/28* (2006.01)
(Continued)

(52) U.S. Cl.
CPC ............ *G01M 15/14* (2013.01); *F01D 5/288* (2013.01); *F01D 21/003* (2013.01);
(Continued)

(58) Field of Classification Search
CPC .. G01M 15/14; G01M 99/002; G01M 5/0016; G01M 5/0041; G01M 5/0066;
(Continued)

(56) References Cited

U.S. PATENT DOCUMENTS 10,119,863 B2 * 11/2018 Boudin ................ F01D 21/003
2010/0119370 A1 * 5/2010 Myhr ..................... F03D 80/40
416/169 R
(Continued)

FOREIGN PATENT DOCUMENTS

CN    101776645 A    7/2010
CN    103063534 A    4/2013
(Continued)

OTHER PUBLICATIONS

International Search Report for PCT/CN2019/123637 mailed on Mar. 2, 2020, ISA/CN.

*Primary Examiner* — Lisa M Caputo
*Assistant Examiner* — Cynthia L Davis
(74) *Attorney, Agent, or Firm* — Yue (Robert) Xu; Apex Attorneys at Law, LLP (57) ABSTRACT

Disclosed is a turbine vane thermal barrier coating working condition simulation experiment test system, including: a working state simulation device, a service environment simulation device and a detection device. The working state simulation device is provided on one side of the turbine vane thermal barrier coating to be tested, is connected to the turbine vane thermal barrier coating to be tested, and is configured to simulate a high-speed rotation working state of the turbine vane thermal barrier coating to be tested. The service environment simulation device is provided on the other side of the turbine vane thermal barrier coating to be tested. The detection device is configured to detect damage
(Continued)

generated when the turbine vane thermal barrier coating to be tested rotates at a high speed in the service environment.

13 Claims, 2 Drawing Sheets

(51) Int. Cl.
   *F01D 21/00* (2006.01)
   *G01M 99/00* (2011.01)
(52) U.S. Cl.
   CPC ...... *F05D 2230/90* (2013.01); *F05D 2260/81* (2013.01); *F05D 2260/83* (2013.01); *G01M 99/002* (2013.01)
(58) Field of Classification Search
   CPC .... G01M 5/0033; F01D 5/288; F01D 21/003; F05D 2230/90; F05D 2260/81; F05D 2260/83; G01N 3/06; G01N 3/066; G01N 3/068; G01N 3/565; G01N 3/567; G01N 2203/0005; G01N 2203/0226; G01N 2203/0228; G01N 2203/024; G01N 2203/0617; G01N 2203/0641; G01N 2203/0658; G01N 3/56; G01N 3/60
   See application file for complete search history.

(56) References Cited

U.S. PATENT DOCUMENTS

| | | | |
|---|---|---|---|
| 2012/0152007 A1 | 6/2012 | Holmes et al. | |
| 2012/0225750 A1* | 9/2012 | Allen | ...................... F01D 15/00 477/3 |
| 2015/0355074 A1* | 12/2015 | Zhou | ...................... G01M 15/02 374/57 |

FOREIGN PATENT DOCUMENTS

| | | | |
|---|---|---|---|
| CN | 103091189 A | | 5/2013 |
| CN | 103487345 A | | 1/2014 |
| CN | 107192545 A | * | 9/2017 |
| CN | 108254275 A | | 7/2018 |
| CN | 109682702 A | | 4/2019 |

* cited by examiner

SIMULATION EXPERIMENTAL TEST SYSTEM FOR TURBINE BLADE THERMAL BARRIER COATING WORKING CONDITION

The present application is a U.S. National Phase application based upon PCT Application Serial No. PCT/CN2019/123637 filed on Dec. 6, 2019, titled "SIMULATION EXPERIMENTAL TEST SYSTEM FOR TURBINE BLADE THERMAL BARRIER COATING WORKING CONDITION", which claims the benefit of priority to Chinese patent application No. 201811505735.4, titled "SIMULATION EXPERIMENTAL TEST SYSTEM FOR TURBINE BLADE THERMAL BARRIER COATING WORKING CONDITION", the entire disclosures of which are incorporated herein by reference.

TECHNICAL FIELD

The present invention relates to the testing field of high-pressure turbine vane thermal barrier coatings for aeroengines, and more particularly, to a turbine vane thermal barrier coating simulation experiment test system.

BACKGROUND

An aeroengine is an important symbol of national core competitiveness. The high-pressure turbine vane is the most demanding core part in the engine in terms of temperature and load. It is also a short board that restricts the engine. Thermal protection technology is urgently needed. Among the three major thermal protection technologies, the development potential of single crystal and cooling gas film technology is very limited. Thermal barrier coating is recognized as the most practical way to increase the service temperature of the engine. The world's aviation powers have listed thermal barrier coating as core key technology in major promotion plans. China has also listed thermal barrier coating as the key technology urgently needed for the development of advanced aeroengines.

The thermal barrier coating applied to the high-pressure turbine vane needs to face extremely harsh service environments such as high-temperature and high-speed gas thermal shock, particle erosion, and calcium magnesium aluminum silicon oxide (CMAS) corrosion. Especially, high-pressure rotor working vanes also need to face the high-speed rotating centrifugal force, and the turbulence, wake, hot spots and other loads caused by the interaction of high-speed rotation and gas, resulting in extremely difficult peeling failure of the coating, which has become a huge bottleneck restricting the development and application of the thermal barrier coating. Studying the mechanism of thermal barrier coating peeling failure in service environments is the core and key to improving the process and optimizing the design. However, it is unrealistic for these environments to rely on conventional tensile, bending, thermal fatigue, thermal shock and other experimental methods, and it takes a lot of manpower and financial resources to test the actual engine and also loses the experiment data of the evolution of damage parameters during the failure process. Therefore, it is particularly important to develop experiment test devices for their service working conditions.

At present, a lot of work has been carried out in the domestic and international experiment devices for thermal barrier coating service working conditions. The main progress includes the following aspects. First, devices for simulating high-temperature oxidation, thermal fatigue and other conditions include high-temperature furnaces, automatic thermal cycle furnace, etc. Second, working condition experiment devices mainly based on gas thermal shock, for example, NASA's high-pressure gas simulation and experiment device can simulate a gas flow rate and a working pressure, and a thermal barrier coating corrosion device developed by the German National Energy Research Center can simulate high-temperature erosion, thermal shock, temperature gradient and other service environments, and the service environment simulation and test device developed by Xiangtan University in the early stage can realize the integrated simulation of high temperature, erosion and CMAS corrosion service environment. Third, high-speed rotating centrifugal force simulation experiment devices are provided, wherein, for example, Beijing University of Aeronautics and Astronautics uses a material testing machine and electric heating to simulate the combined effect of high-speed rotating centrifugal tensile stress and high-temperature load on the thermal barrier coating. The LCS-4B and LCS-4C high-speed gas devices developed by the NLR in the Netherlands and the NRC Aeronautical Research Center in Canada, and a dynamic simulation device developed by the Cincinnati University in the United States can initially realize the simulation of the rotation state. However, due to core confidentiality, there is no schematic diagram of working principle and specific structure report. But up to now, it has not yet achieved the simultaneous simulation of high temperature, erosion, CMAS corrosion service environment and a high-speed rotation working state, nor has it achieved the detection of the thermal barrier coating failure process during this simulation experiment.

The present invention intends to develop a turbine vane thermal barrier coating working condition simulation experiment test device. The turbine vane thermal barrier coating working condition simulation experiment test device can realize the simultaneous simulation of high temperature, erosion, CMAS corrosion service environment and a high-speed rotation working state, realizes simultaneous detection of a guide vane thermal barrier coating and a working vane thermal barrier coating, and realizes real-time detection of a failure process of the turbine vane thermal barrier coating.

SUMMARY

An object of the present invention is to provide a device capable of simulating a service environment of a turbine vane thermal barrier coating and detecting key damage of the turbine vane thermal barrier coating in real time.

In order to achieve the above object, the present invention provides a turbine vane thermal barrier coating working condition simulation experiment test system, including: a working state simulation device, a service environment simulation device and a detection device. The working state simulation device is provided on one side of a turbine vane thermal barrier coating to be tested, is connected to the turbine vane thermal barrier coating to be tested, and is configured to simulate a high-speed rotation working state of the turbine vane thermal barrier coating to be tested. The service environment simulation device is provided on the other side of the turbine vane thermal barrier coating to be tested, and is configured to simulate a service environment of the turbine vane thermal barrier coating to be tested under the high-speed rotation working state. The detection device is configured to detect damage generated when the turbine vane thermal barrier coating to be tested rotates at a high speed in the service environment.

Further, the working state simulation device includes a first motor, a low-speed shaft, a gearbox, and a high-speed shaft. The first motor is connected to one end of the low-speed shaft and drives the low-speed shaft to rotate. The gearbox is provided with a first gear and a second gear that engage with each other. The radius of the first gear is greater than the radius of the second gear. The other end of the low-speed shaft is connected to the first gear and drives the first gear to rotate. The first gear drives the second gear to rotate. The second gear is connected to one end of the high-speed shaft and drives the high-speed shaft to rotate. The other end of the high-speed shaft is connected to the turbine vane thermal barrier coating to be tested, and drives the turbine vane thermal barrier coating to be tested to rotate at a high speed.

Further, the working state simulation device includes a load compressor. The load compressor is connected to the second gear to absorb energy generated during the high-speed rotation of the turbine vane thermal barrier coating to be tested, so that the turbine vane thermal barrier coating to be tested rotates stably.

Further, the service environment simulation device includes: a high-temperature thermal shock loading device configured to provide a simulated environment for high-temperature working condition service; an erosion working condition service loading device configured to provide a simulated environment for erosion working condition service; a corrosion working condition service loading device configured to provide a simulated environment for corrosion working condition service; and a cooling working condition loading device configured to provide a simulated environment for temperature gradient working condition service for cooling the turbine vane thermal barrier coating to be tested.

Further, the high-temperature thermal shock loading device includes a combustible liquid supply part, a combustion-supporting gas supply part and an ejection part. The combustible liquid supply part communicates with an input end of the ejection part, and inputs combustible liquid to the ejection part. The combustion-supporting gas supply part is connected to the input end of the ejection part, and inputs combustion-supporting gas to the ejection part. The combustion-supporting gas is configured to support combustion of the combustible liquid. An output end of the ejection part is aligned with the turbine vane thermal barrier coating to be tested, and ejects burned high-temperature gas to the turbine vane thermal barrier coating to be tested.

Further, the erosion working condition loading device includes an erosion particle storage, a first precision powder feeder and a second motor. The erosion particle storage stores erosion particles. The first precision powder feeder communicates with the erosion particle storage and the ejection part respectively to convey the erosion particles to the ejection part to be mixed with high-temperature gas. The second motor is electrically connected to the first precision powder feeder to supply power to the precision powder feeder. The output end of the ejection part is aligned with the turbine vane thermal barrier coating to be tested, and ejects mixed high-temperature gas to the turbine vane thermal barrier coating to be tested.

Further, the erosion working condition loading device further includes a first pipe, a first flow controller, and a first pressure regulating valve. The first precision powder feeder and the ejection part communicate with each other through the first pipe. The first pipe is provided with the first flow controller and the first pressure regulating valve to respectively control conveying flow and pressure of the erosion particles.

Further, the corrosion working condition loading device includes a corrosion particle storage, a second precision powder feeder, and a third motor. The corrosion particle storage stores corrosion particles. The second precision powder feeder communicates with the corrosion particle storage and the ejection part respectively to convey the corrosion particles to the ejection part to be mixed with high-temperature gas. The third motor is electrically connected to the second precision powder feeder to supply power to the second precision powder feeder. The output end of the ejection part is aligned with the turbine vane thermal barrier coating to be tested, and ejects mixed high-temperature gas to the turbine vane thermal barrier coating to be tested.

Further, the corrosion working condition loading device further includes a second pipe, a second flow controller, and a second pressure regulating valve. The second precision powder feeder and the ejection part communicate with each other through the second pipe. The second pipe is provided with the second flow controller and the second pressure regulating valve to respectively control conveying flow and pressure of the corrosion particles.

Further, the cooling working condition loading device includes an air compressor, an air heater, and a fourth motor. The air compressor communicates with the air heater, and inputs compressed air to the air heater. The fourth motor is electrically connected to the air heater to supply power to the air heater. The air heater heats the air compressed by the air compressor and inputs the same to high-temperature parts including the turbine vane thermal barrier coating to be tested and the ejection part.

Further, the air compressor also communicates with the high-temperature thermal shock loading device to provide combustion-supporting gas to the high-temperature thermal shock loading device.

Further, the load compressor communicates with the air compressor, and outputs the absorbed energy to the air compressor.

Further, the load compressor communicates with the high-temperature thermal shock loading device to provide combustion-supporting gas to the high-temperature thermal shock loading device.

Further, the detection device includes: a non-contact three-dimensional deformation test module configured to perform real-time detection on a stress field, a strain field and a displacement field of the turbine vane thermal barrier coating to be tested; a temperature test and collection module configured to perform real-time test and collection on temperature of the turbine vane thermal barrier coating to be tested, temperature of the environment where the turbine vane thermal barrier coating to be tested is located and temperature of the service environment simulation device; a high-speed CCD camera module configured to photograph a working state of the turbine vane thermal barrier coating to be tested rotating at a high speed in a service environment; an acoustic emission detection system module configured to perform real-time detection on crack formation and initiation of the turbine vane thermal barrier coating to be tested rotating at the high speed in the service environment; an infrared detection system module configured to perform real-time detection on interface delamination of the turbine vane thermal barrier coating rotating at the high speed in the service environment; and a complex impedance spectroscopy test module configured to perform real-time detection on interface oxidation and coating corrosion of the turbine vane thermal barrier coating rotating at the high speed in the service environment.

Further, the above-mentioned turbine vane thermal barrier coating working condition simulation experiment test system further includes a plurality of experiment models for the turbine vane thermal barrier coating to be tested.

Further, the above-mentioned turbine vane thermal barrier coating working condition simulation experiment test system further includes an experiment console. The working state simulation device, the service environment simulation device, the detection device and the turbine vane thermal barrier coating to be tested are all provided on the experiment console.

Further, the above-mentioned turbine vane thermal barrier coating working condition simulation experiment test system further includes an experiment parameter testing, control and storage device. The experiment parameter testing, control and storage device is connected to the working state simulation device, the service environment simulation device and the detection device, and is configured to test, control and store test parameters and test results of the working state simulation device, the service environment simulation device and the detection device.

Further, the above-mentioned turbine vane thermal barrier coating working condition simulation experiment test system further includes an auxiliary device which provides auxiliary functions of protection, antivibration, safety protection, exhaust gas and particle emission for the turbine vane thermal barrier coating to be tested and the experiment device.

The above technical solution of the present invention has the following beneficial technical effects.

(1) The service environment simulation device can simultaneously simulate various service environments of the turbine vane thermal barrier coating under the high-speed rotation state, wherein the service environments include high temperature, erosion and corrosion. Thus, the load is closer to the actual service working condition of the turbine vane thermal barrier coating, and the measured values are more accurate.

(2) The detection device can perform real-time non-destructive detection on the damage of the turbine vane thermal barrier coating under high-speed rotation in the service environment, can learn the working state of the turbine vane thermal barrier coating in real time, provides direct experimental data to the understanding of the damage mechanism and performance evaluation of the turbine vane thermal barrier coating, and provides technical support for process optimization and independent design of the thermal barrier coating.

(3) The load compressor absorbs energy generated by the high-speed rotation of the turbine vane thermal barrier coating to be tested to enable the turbine vane thermal barrier coating to be tested to rotate stably, and can transfer the absorbed energy to the air compressor, or communicates with the high-temperature thermal shock loading device to provide the combustion-supporting gas to the high-temperature thermal shock loading device.

REFERENCE NUMERAL IN THE FIGURES

1: Working state simulation device, 11: First motor, 12: Low-speed shaft, 13: Gearbox, 14: Load compressor;
2: Service environment simulation device, 21: High-temperature thermal shock loading device, 211: Combustible liquid supply part, 212: Combustion-supporting gas supply part, 213: Ejection part, 22: Erosion working condition loading device, 221: Erosion particle storage, 222: First precision powder feeder, 223: Second motor, 224: First pipe, 225: First flow controller, 226: First pressure regulating valve, 23: Corrosion working condition loading device, 231: Corrosion particle storage, 232: Second precision powder feeder, 233: Third motor, 234: Second pipe, 235: Second flow controller, 236: Second pressure regulating valve, 24: Cooling working condition loading device, 241: Air compressor, 242: Air heater, 243: Fourth motor;
3: Detection device, 31: Non-contact three-dimensional deformation test module, 32: Temperature test and collection module, 33: High-speed CCD camera module, 34: Acoustic emission detection system module, 35: Infrared detection system module, 36: Complex impedance spectroscopy test module;
4: Experiment console, 41: Test chamber;
51: Hardware protection device, 52: Antivibration device, 53: Water cooling device, 54: Exhaust gas and particle discharge device; and
6: Experiment model, 61: Turbine disk, 62: Working vane thermal barrier coating, 63: Hub, 64: Guide vane thermal barrier coating, 65: Spoiler.

DETAILED DESCRIPTION

In order to make the objects, technical solutions and advantages of the present invention clearer, the present invention will be further described in detail below in combination with specific embodiments and with reference to the accompanying drawings. It should be understood that these descriptions are only exemplary and are not intended to limit the scope of the present invention. In addition, in the following description, descriptions of well-known structures and techniques are omitted to avoid unnecessarily obscuring the concept of the present invention.

In the following description, a turbine vane thermal barrier coating is a turbine vane coated with a thermal barrier coating, a working vane thermal barrier coating is a working vane coated with a thermal barrier coating, and a guide vane thermal barrier coating is a guide vane coated with a thermal barrier coating.

Figure 1:
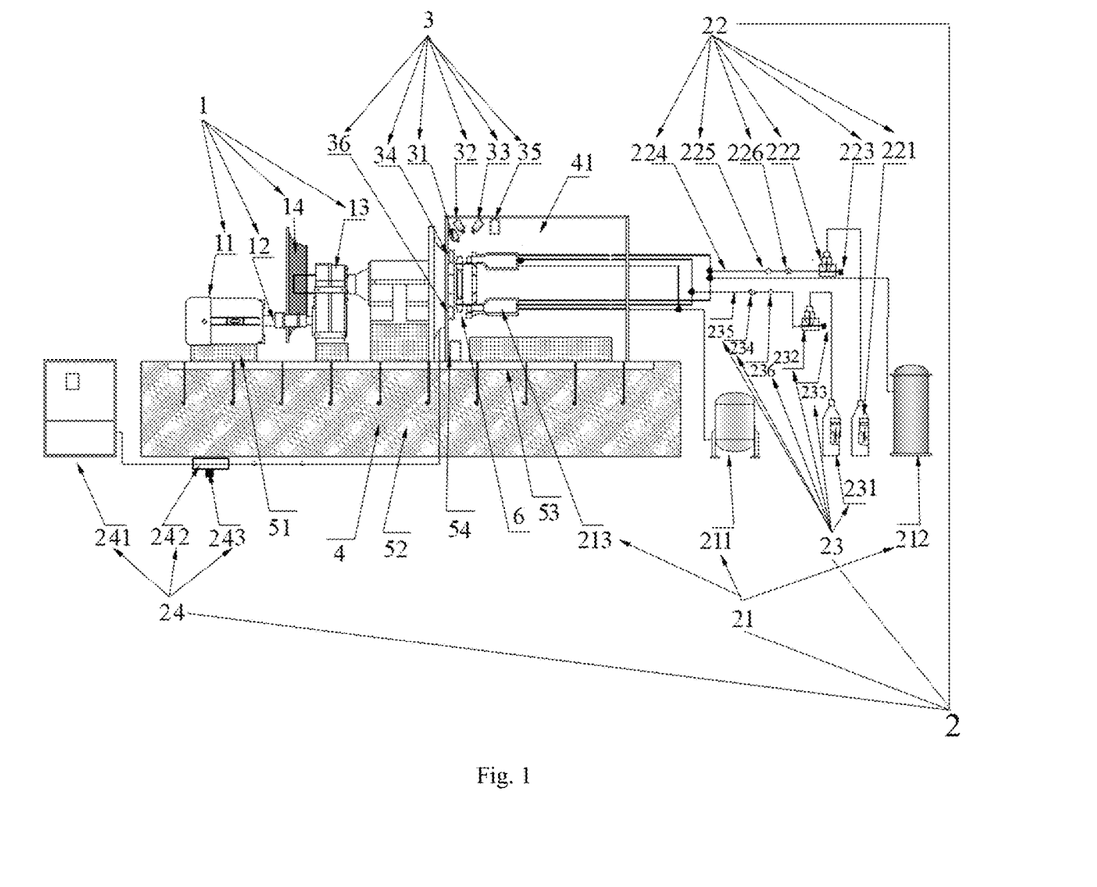
FIG. 1 is a schematic structural diagram of a turbine vane thermal barrier coating working condition simulation experiment test system of the present invention.

FIG. 1 is a schematic structural diagram of a turbine vane thermal barrier coating working condition simulation experiment test system of the present invention.

As shown in FIG. 1, the present invention provides a turbine vane thermal barrier coating working condition simulation experiment test system, including: a working state simulation device 1, a service environment simulation device 2 and a detection device 3. The working state simulation device 1 is provided on one side of a turbine vane thermal barrier coating to be tested, is connected to the turbine vane thermal barrier coating to be tested, and is configured to simulate a high-speed rotation working state of the turbine vane thermal barrier coating to be tested. The service environment simulation device 2 is provided on the other side of the turbine vane thermal barrier coating to be tested, and is configured to simulate a service environment of the turbine vane thermal barrier coating to be tested under the high-speed rotation working state. The detection device 3 is configured to detect damage generated when the turbine vane thermal barrier coating to be tested rotates at a high speed in the service environment. The working state simulation device 1, the service environment simulation device 2 and the detection device 3 provided by the present invention perform working state simulation and service environment simulation on the turbine vane thermal barrier coating to be tested, and perform real-time detection to facilitate real-time detection of key damage parameters in a failure process of the turbine vane thermal barrier coating and provide technical support for process optimization and independent design of the thermal barrier coating.

Specifically, the working state simulation device 1 includes a first motor 11, a low-speed shaft 12, a gearbox 13, and a high-speed shaft. The first motor 11 is connected to one end of the low-speed shaft 12 and drives the low-speed shaft 12 to rotate. The gearbox 13 is provided with a first gear and a second gear that engage with each other. The radius of the first gear is greater than the radius of the second gear. The other end of the low-speed shaft 12 is connected to the first gear and drives the first gear to rotate. The first gear drives the second gear to rotate. The second gear is connected to one end of the high-speed shaft and drives the high-speed shaft to rotate. The other end of the high-speed shaft is connected to the turbine vane thermal barrier coating to be tested and drives the turbine vane thermal barrier coating to be tested to rotate at the high speed. The first motor 11 provides power for rotation of both the working state simulation device 1 and the turbine vane thermal barrier coating to be tested, and in a process of transmitting of torque through the low-speed shaft 12, the gearbox 13 and the high-speed shaft, accelerates the turbine vane thermal barrier coating to be tested to enable the turbine vane thermal barrier coating to be tested to rotate at the high speed, which meets a speed requirement.

Preferably, the working state simulation device 1 includes a load compressor 14. The load compressor 14 is connected to the second gear to absorb energy generated during the high-speed rotation of the turbine vane thermal barrier coating to be tested, so as to enable the turbine vane thermal barrier coating to be tested to rotate stably.

Specifically, the service environment simulation device 2 includes: a high-temperature thermal shock loading device configured to provide a simulated environment for high-temperature working condition service; an erosion working condition service loading device 22 configured to provide a simulated environment for erosion working condition service; a corrosion conditions loading device configured to provide a simulated environment for corrosion working condition service; and a cooling working condition loading device 24 configured to provide a simulated environment for temperature gradient working condition service for cooling the turbine vane thermal barrier coating to be tested. The service environment simulation device 2 can simultaneously simulate the service environment of the turbine vane thermal barrier coating including high temperature, erosion and corrosion when rotating at a high speed, can also simulate the service environment of the temperature gradient working condition, detects the failure mechanism of the turbine vane thermal barrier coating at different temperatures, and provides technical support for process optimization and independent design of the thermal barrier coating.

Specifically, the high-temperature thermal shock loading device includes a combustible liquid supply part 211, a combustion-supporting gas supply part 212, and an ejection part 213. The combustible liquid supply part 211 communicates with an input end of the ejection part 213, and inputs combustible liquid to the ejection part 213. The combustion-supporting gas supply part 212 communicates with the input end of the ejection part 213, and inputs combustion-supporting gas to the ejection part 213. The combustion-supporting gas is configured to support combustion of the combustible liquid. An output end of the ejection part 213 is aligned with the turbine vane thermal barrier coating to be tested, and ejects burned high-temperature gas to the turbine vane thermal barrier coating to be tested, which provides a high-temperature service environment for the turbine vane thermal barrier coating to be tested.

Specifically, the erosion working condition loading device 22 includes an erosion particle storage 221, a first precision powder feeder 222 and a second motor. The erosion particle storage 221 stores erosion particles. The first precision powder feeder 222 communicates with the erosion particle storage 221 and the ejection part 213 respectively to convey the erosion particles to the ejection part 213 to be mixed with the high-temperature gas. The second motor is electrically connected to the first precision powder feeder 222 to supply power to the precision powder feeder. The output end of the ejection part 213 is aligned with the turbine vane thermal barrier coating to be tested to eject the mixed high-temperature gas to the turbine vane thermal barrier coating to be tested.

Preferably, the erosion working condition loading device 22 further includes a first pipe 224, a first flow controller and a first pressure regulating valve. The first precision powder feeder 222 and the ejection part 213 communicate with each other through the first pipe 224. The first pipe The 224 is provided with the first flow controller and the first pressure regulating valve to respectively control conveying flow and pressure of the erosion particles. Failure mechanisms in different degrees of erosion service environments can be detected, and technical support is provided for process optimization and independent design of the thermal barrier coating.

Specifically, the corrosion working condition loading device includes a corrosion particle storage, a second precision powder feeder 232, and a third motor. The corrosion particle storage stores corrosion particles. The second precision powder feeder 232 communicates with the corrosion particle storage and the ejection part 213 respectively to convey the corrosion particles to the ejection part 213 to be mixed with high-temperature gas. The third motor is electrically connected to the second precision powder feeder 232 to supply power to the second precision powder feeder 232. The output end of the ejection part 213 is aligned with the turbine vane thermal barrier coating to be tested to eject the mixed high-temperature gas to the turbine vane thermal barrier coating to be tested.

Preferably, the corrosion working condition loading device further includes a second pipe 234, a second flow controller 235, and a second pressure regulating valve 236. The second precision powder feeder 232 and the ejection part 213 communicate with each other through the second pipe 234. The second pipe 234 is provided with the second flow controller 235 and the second pressure regulating valve 236 to respectively control conveying flow and pressure of the corrosion particles. Failure mechanisms in different degrees of corrosive service environments can be detected, and technical support is provided for process optimization and independent design of the thermal barrier coating.

Specifically, the cooling working condition loading device 24 includes an air compressor 241, an air heater 242, and a fourth motor 243. The air compressor 241 communicates with the air heater 242, and inputs compressed air to the air heater 242. The fourth motor 243 is electrically connected to the air heater 242 to supply power to the air heater 242. The air heater 242 heats the air compressed by the air compressor 241 and inputs the same to high-temperature parts including the turbine vane thermal barrier coating to be tested and the ejection part 213.

Preferably, the air compressor 241 also communicates with the high-temperature thermal shock loading device, and specifically communicates with the combustible liquid supply part 211. The compressed air generated by the air compressor 241 supports combustion of the combustible liquid, or supports combustion of the combustible liquid after being mixed with the combustion-supporting gas supply part 212.

Preferably, the load compressor 14 communicates with the air compressor 241 and outputs the absorbed energy to the air compressor 241 to drive the air compressor 241 to work.

Specifically, the detection device 3 includes: a non-contact three-dimensional deformation test module 31 configured to perform real-time detection on a stress field, a strain field and a displacement field of the turbine vane thermal barrier coating to be tested; a temperature test and collection module 32 configured to perform real-time test and collection on temperature of the turbine vane thermal barrier coating, temperature of the environment where the turbine vane thermal barrier coating to be tested is located and temperature of the service environment simulation device 2; a high-speed CCD camera module 33 configured to photograph the turbine vane thermal barrier coating to be tested under high-speed rotation in the service environment; an acoustic emission detection system module 34 configured to perform real-time detection on crack formation and initiation of the turbine vane thermal barrier coating to be tested under high-speed rotation in the service environment; an acoustic emission detection system module 35 configured to perform real-time detection on interface delamination of the turbine vane thermal barrier coating under high-speed rotation in the service environment; and a complex impedance spectroscopy test module 36 configured to perform real-time detection on interface oxidation and coating corrosion of the turbine vane heat barrier coating under high-speed rotation in the service environment. The above detection modules may be disposed near the turbine vane thermal barrier coating to be tested, so that the turbine vane thermal barrier coating to be tested is placed in a detection range of the detection device 3.

Preferably, the non-contact three-dimensional deformation test module 31 is an ARAMIS non-contact three-dimensional deformation online measurement module produced by the German GOM company, which is configured to measure the three-dimensional deformation of a thermal barrier coating sample. The temperature test and collection module 32 has two general schemes, one of which is collection through a thermocouple, and the other is the use of infrared thermometer. The thermocouple adopts B type platinum and rhodium thermocouple of 1600° C. As shown in FIG. 1, a thermocouple is used. The high-speed CCD camera module 33 is an AVT Manta G-504 high-speed camera system produced by the German AVT company to measure the surface topography of the thermal barrier coating sample. The acoustic emission detection module is a PCI-II type acoustic emission instrument produced by the American PAC company, which is configured to test the crack formation and initiation process of the thermal barrier coating. The infrared detection module is an FLIR GF309 type infrared detection system produced by the American Flier Company, which is configured to detect the interface delamination of the thermal barrier coating. The complex impedance spectroscopy test module 36 is a 1260+1287 test system produced by the British Power Transmission Corporation, which is configured to test the interface oxidation and coating corrosion of the turbine vane thermal barrier coating.

Specifically, the above-mentioned turbine vane thermal barrier coating working condition simulation experiment test system further includes an experiment console 4. The working state simulation device 1, the service environment simulation device 2, the detection device 3 and the turbine vane thermal barrier coating to be tested are all provided on the experiment console 4.

Preferably, the above-mentioned turbine vane thermal barrier coating working condition simulation experiment test system further includes an experiment parameter testing, control and storage device. The experiment parameter testing, control and storage device is connected to the working state simulation device 1, the service environment simulation device 2 and the detection device 3 to test, control and store test parameters and test results of the working state simulation device 1, the service environment simulation device 2 and the detection device 3.

Preferably, the above-mentioned turbine vane thermal barrier coating working condition simulation experiment test system further includes an auxiliary device which provides auxiliary functions of protection, antivibration, safety protection, exhaust gas and particle emission for the turbine vane thermal barrier coating to be tested and the experiment device.

Preferably, the auxiliary system includes a hardware protection device 51 configured to protect the experiment device; an antivibration device 52 configured to prevent impact of accidental vibration on the experiment test; a water cooling device 53 configured to cool the device; and an exhaust gas and particle discharge device 54 configured to exhaust the exhaust gas and particles after the test.

Figure 2:
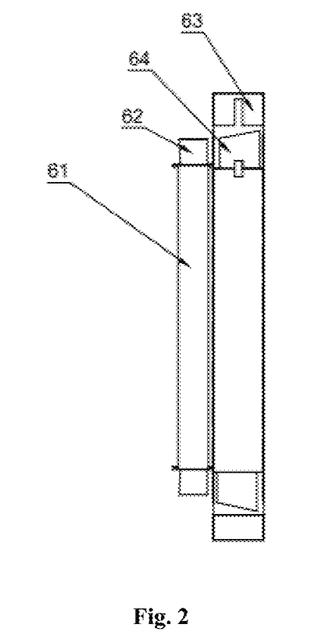
FIG. 2 is a schematic structural diagram of a first experiment model in the present invention.
Figure 3:
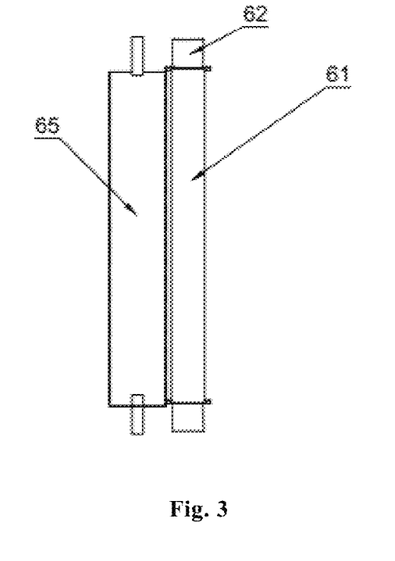
FIG. 3 is a schematic structural diagram of a second experiment model in the present invention.

Specifically, the turbine vane thermal barrier coating includes a working vane thermal barrier coating 62 and a guide vane thermal barrier coating 64, so the above-mentioned turbine vane thermal barrier coating is divided into two experiment models for the turbine vane thermal barrier coating to be tested in order to separately detect the working vane thermal barrier coating 62 and the guide vane thermal barrier coating 64, which will be described separately below.

The two structures of the experiment model are as follows.

As shown in FIG. 2, the first experiment model includes: a turbine disk, a working vane thermal barrier coating 62, a hub 63, and a guide vane thermal barrier coating 64. The turbine disk is installed on an output end of the first motor 11. The working vane thermal barrier coating 62 is disposed on the edge of the turbine disk. The hub 63 is provided on a side of the turbine disk away from the first motor 11, and is parallel to the turbine disk. The hub 63 is ring-shaped. The guide vane thermal barrier coating 64 is provided on the inner edge of the hub 63.

A high-temperature flame outlet of the ejection part 213 is disposed on a side of the guide vane thermal barrier coating 64 away from the working vane thermal barrier coating 62 and toward the guide vane thermal barrier coating 64 and the working vane thermal barrier coating 62.

When in use, the first motor 11 is started to drive the turbine disk and the working vane thermal barrier coating 62 thereon to rotate at a high speed. At the same time, the ejection part 213 is started to eject high-temperature flame to the guide vane thermal barrier coating 64 and the working vane thermal barrier coating 62. At this time, the stationary guide vane thermal barrier coating 64 can be tested by a test device to analyze the performance of the guide vane thermal barrier coating 64.

As shown in FIG. 3, the second experiment model includes: a turbine disk, a working vane thermal barrier coating 62, and a spoiler 65. The working vane thermal barrier coating 62 is disposed on the edge of the turbine disk. The spoiler 65 and the turbine disk are parallel and spaced apart with each other. The spoiler 65 is installed on an output end of the first motor 11.

A high-temperature flame outlet of the ejection part 213 is disposed on a side of the working vane thermal barrier coating 62 away from the spoiler 65 and toward the working vane thermal barrier coating 62 and the spoiler 65.

When in use, the first motor 11 is started to drive the spoiler 65 to rotate at a high speed. At the same time, the ejection part 213 is started to eject high-temperature flame to the spoiler 65 and the working vane thermal barrier coating 62. The rotation of the spoiler 65 drives an air flow to move in order to simulate the air flow generated by the rotation of the working vane thermal barrier coating 62 in the service environment. At this time, the stationary vane thermal barrier coating 62 can be tested by a test device to analyze the performance of the thermal vane thermal barrier coating 62. It solves the problem that it is difficult to test the working vane thermal barrier coating 62 rotating at the high speed.

Since the working vane thermal barrier coating 62 rotates at the high speed during service, a centrifugal force will be generated. In order to simulate the centrifugal force of the working vane thermal barrier coating 62, a stretching machine is provided.

Specifically, the stretching machine is fixedly installed and is connected to the extension of the working vane thermal barrier coating 62. That is, a tensile force is applied to the working vane thermal barrier coating 62 through the edge of the working vane thermal barrier coating 62. By using the stretching machine to apply the tensile force to the working vane thermal barrier coating 62, the centrifugal force in the service environment is simulated, so that the experiment test device is close to the service environment of the working vane thermal barrier coating 62, thereby ensuring the accuracy and validity of the test results.

During the simulation of the working states of the working vane thermal barrier coating 62 and the guide vane thermal barrier coating 64, the high-power first motor 11 drives a transmission system composed of a gearbox 1312 and a supporting multi-level rotating shaft to drive the experiment model to rotate at a high speed, and the load compressor 14 is adopted to ensure the balance of the rotating device, wherein a speed range is 0-30000 r/min.

An overload protection device is also included. The overload protection device is connected to the working state simulation device 1 and controls shutdown of the working state simulation device 1 in an overload state.

Specifically, an over-rotation protection system is composed of an overload protector and its accessory solenoid valve. When the rotation speed of the turbine disk or spoiler 65 exceeds a set value, the first motor 11 is forcibly turned off and an alarm is issued.

The steps of using this experiment test system to conduct simulation experiments and real-time detection on the first experiment model are as follows.

In the first step, a sample is prepared. A plasma spraying process is adopted to spray a thermal barrier coating insulation material on the surface of a certain type of hollow guide vane. An EB-PVD spraying process is adopted to spray a thermal barrier coating insulation material on the surface of a certain type of hollow working vane, and has system compositions as follows: the material of a transition layer is NiCrAlY alloy, and the thickness of the transition layer is about 100; and the ceramic powder material is zirconium dioxide containing 8 (wt.)% of Y2O3, and thickness of the ceramic layer is about 300. Finally, a layer of black ultra-high temperature resistant paint is sprayed on the surface of the sample to form a speckle field with high reflective performance on the surface of the sample, which is used as the characteristic speckle field of the ARAMIS non-contact three-dimensional deformation online measurement system.

In the second step, the prepared guide vane thermal barrier coating 64 and working vane thermal barrier coating 62 are correctly assembled into an experiment model, and the experiment model is installed in a test chamber 41.

In the third step, the ejection part 213 is fixed in the test chamber 41, and the movement of an ejection gun is controlled by a servo motor through moving a guide rail. After the turbine model is fixed, the output end of the ejection part 213 can be directed toward the experiment model, and the ejection part 213 is provided with a cooling channel.

In the fourth step, infrared thermometers are adjusted or the thermocouples are fixed on the surface of the guide vane thermal barrier coating 64, the cooling bottom inlet of the cooling channel of the guide vane thermal barrier coating 64, and the cooling top outlet of the cooling channel of the guide vane thermal barrier coating 64 respectively. Each thermocouple is connected to the temperature test and collection module 32 and determines whether each instrument is working normally.

In the fifth step, the ARAMIS non-contact 3D deformation detection system is started. The CCD camera is adjusted to determine a focused area of the sample under test, and the preliminary calibration work is performed. The strain test software is opened, the shooting frequency of the ARAMIS test software is set to 1 frame/5 seconds, and the online test automatically saves the data mode. The AVT Manta G-504 high-speed camera system is started. The CCD camera is adjusted to determine the focused area of the sample under test. The test software is opened, the shooting frequency of the AVT Manta G-504 test software is set to 1 frame/5 seconds, and the online test automatically saves the data mode.

In the sixth step, the experiment model and the cooling water switch of the eject part 213 are turned on. The experiment model and the cooling gas control switch of the internal channel of the high-speed rotating part are turned on, so that the cooling gas enters the vane from the cooling channel at the bottom of the turbine vane thermal barrier coating, and is discharged from a top through hole, and a temperature gradient is formed from the surface of the ceramic coating to the inner surface of the metal substrate.

In the seventh step, the high-power motor is started to drive a transmission system composed of the gearbox 13 and the supporting multi-stage rotating shaft to drive the turbine model to rotate at a high speed, and the load compressor 14 is started.

In the eighth step, the ejection part 213, the erosion working condition loading device 22 and the corrosion working condition loading device are started; and the kerosene flow and oxygen flow are adjusted, and the gas temperature will stabilize at 1000° C. after 8-10 seconds of automatic ignition. The heating rate is about 100° C./s, and the temperature of the surface coating is stabilized at about 1000° C. and held for 5 minutes. In this specific embodiment, each thermal cycle mode is that the heating time is 10 s, the holding time 300 s, and the cooling time is 200 s. The number of thermal cycles is set.

In the ninth step, the temperature field change and the strain field and displacement field change of the guide vane thermal barrier coating 64, an acoustic emission signal of crack initiation and expansion, an infrared detection signal of interface delamination, a complex impedance spectroscopy signal of interface oxidation and ceramic layer microstructure evolution, surface morphology and coating peeling conditions taken by the CCD, etc. are tested and recorded in real time.

In the tenth step, after the simulation experiment is completed, the experimental data is analyzed and collated to determine a failure mechanism and a dangerous area of the guide vane thermal barrier coating 64.

The steps of using this experiment test system to conduct simulation experiments and real-time detection on the second experiment model are as follows.

In the first step, a sample is prepared. An EB-PVD spraying process is adopted to spray a thermal barrier coating insulation material on the surface of a certain type of hollow working vane, and has system compositions as follows: the material of the transition layer is NiCrAlY alloy, and the thickness of the transition layer is about 100 μm; and the ceramic powder material is zirconium dioxide containing 8 (wt.)% Y2O3, and the thickness of the ceramic layer is about 200 μm. Finally, a layer of black ultra-high temperature resistant paint is sprayed on the surface of the sample to form a speckle field with high reflective performance on the surface of the sample, which is used as a characteristic speckle field of the ARAMIS non-contact three-dimensional deformation online measurement system.

In the second step, the prepared spoiler 65 and working vane thermal barrier coating 62 are assembled together with the turbine disk 61, the hub 63 and other parts correctly to form a turbine model, and the turbine model is installed on the experiment console 4.

In the third step, the ejection part 213 is fixed in the test chamber 41, and the movement of the ejection part 213 is controlled by a servo motor through moving a guide rail. After the experiment model is fixed, the output end of the ejection part 213 can be directed toward the turbine model, and the ejection part 213 is provided with a cooling channel.

In the fourth step, the working vane thermal barrier coating 62 is placed in a proper position of a stretching machine and fixed.

In the fifth step, infrared thermometers are adjusted or thermocouples are installed in place. Each thermocouple is connected to the temperature test and collection module 32 and determines whether each instrument is working normally.

In the sixth step, a signal collection sensor or lens of a non-destructive detection system is installed and adjusted to determine a focused area of the sample under test; test parameters and data saving modes of various non-destructive detection systems are set; and each non-destructive detection system is started.

In the seventh step, the experiment model and the cooling water switch of the ejection part 213 are turned on. The experiment model and the cooling gas control switch of the internal channel of the high-speed rotating part are turned on, so that the cooling gas enters the vane from the bottom cooling channel of the turbine vane and is discharged through the top through hole, and a high temperature gradient is formed from the surface of the ceramic coating to the inner surface of the metal substrate.

In the eighth step, the high-power motor is started to drive a transmission system composed of the gearbox 13 and the supporting multi-stage rotating shaft to drive the spoiler 65 in the turbine model to rotate at a high speed, and the load compressor 14 is started.

In the ninth step, the ejection part 213, the erosion working condition loading device 22 and the corrosion working condition loading device are started; and kerosene flow rate and oxygen flow are adjusted, and the gas temperature will stabilize at 1000° C. after 8-10 seconds of automatic ignition. The heating rate is about 100° C./s, and the temperature of the surface coating is stabilized at about 1000° C. and held for 5 minutes. In this specific embodiment, each thermal cycle mode is that the heating time is 10 s, the holding time is 300 s, and the cooling time 200 s. The number of thermal cycles is set.

In the tenth step, the stretching machine is started to load the working vane thermal barrier coating 62 with an equivalent load.

In the eleventh step, the temperature field change and the strain field and displacement field change of the sample with the working vane thermal barrier coating 62, an acoustic emission signal of crack initiation and expansion, an infrared detection signal of interface delamination, a complex impedance spectroscopy signal of interface oxidation and ceramic layer microstructure evolution, surface morphology and coating peeling conditions taken by the CCD, etc. are tested and recorded in real time.

In the twelfth step, after the simulation experiment is completed, the experimental data is analyzed and collated to determine a failure mechanism and a hazardous area of the working vane thermal barrier coating 62.

Through the above two experiment models, the failure mechanism and dangerous area test of both the guide vane thermal barrier coating 64 and the working vane thermal barrier coating 62 in the turbine vane thermal barrier coatings are completed respectively. The test method is simple and accurate, and easy to implement, has the accurate test results, and provides technical support for process optimization and independent design of the thermal barrier coating.

It should be understood that the above-mentioned specific embodiments of the present invention are only intended to exemplify or explain the principles of the present invention, and do not constitute a limitation on the present invention. Therefore, any modification, equivalent replacement, improvement, etc. made without departing from the spirit and scope of the present invention should be included in the protection scope of the present invention. In addition, the appended claims of the present invention are intended to cover all changes and modifications that fall within the scope and boundary of the appended claims, or equivalent forms of such scope and boundary.

The invention claimed is:

1. A turbine vane thermal barrier coating working condition simulation experiment test system, comprising: a working state simulation device (1), a service environment simulation device (2), a detection device (3), and a model for the turbine vane thermal barrier coating to be tested, wherein the working state simulation device (1) is connected to the turbine vane thermal barrier coating to be tested, and is configured to simulate a high-speed rotation working state of the turbine vane thermal barrier coating to be tested;

the service environment simulation device (2) is configured to simulate a service environment of the turbine vane thermal barrier coating to be tested under the high-speed rotation working state; and the detection device (3) is configured to detect damage generated when the turbine vane thermal barrier coating to be tested rotates at a high speed in the service environment;

the working state simulation device (1) comprises a first motor (11), a low-speed shaft (12), a gearbox (13) and a high-speed shaft;

the first motor (11) is connected to one end of the low-speed shaft (12) to drive the low-speed shaft (12) to rotate;

the gearbox (13) is provided with a first gear and a second gear that engage with each other, the radius of the first gear being greater than the radius of the second gear;

the other end of the low-speed shaft (12) is connected to the first gear to drive the first gear to rotate, and the first gear drives the second gear to rotate;

the second gear is connected to one end of the high-speed shaft to drive the high-speed shaft to rotate; and the other end of the high-speed shaft is connected to the turbine vane thermal barrier coating to be tested, and drives the turbine vane thermal barrier coating to be tested to rotate at the high speed;

the working state simulation device (1) comprises a load compressor (14);

the load compressor (14) is connected to the second gear to absorb energy generated during high-speed rotation of the turbine vane thermal barrier coating to be tested to enable the turbine vane thermal barrier coating to be tested to rotate;

the model for the turbine vane thermal barrier coating to be tested includes a turbine disk (61), a working vane thermal barrier coating (62), and a spoiler (65); the working vane thermal barrier coating (62) is disposed on the edge of the turbine disk (61); the spoiler (65) and the turbine disk (61) are parallel and spaced apart with each other; the spoiler (65) is installed on an output end of the first motor (11).

2. The turbine vane thermal barrier coating working condition simulation experiment test system according to claim 1, wherein the service environment simulation device (2) comprises: a high-temperature thermal shock loading device (21) configured to provide a simulated environment for high-temperature working condition service; an erosion working condition loading device (22) configured to provide a simulated environment for erosion working condition service; a corrosion working condition loading device (23) configured to provide a simulated environment for corrosion working condition service; and a cooling working condition loading device (24) configured to provide a simulated environment for temperature gradient working condition service for cooling the turbine vane thermal barrier coating to be tested.

3. The turbine vane thermal barrier coating working condition simulation experiment test system according to claim 2, wherein the high-temperature thermal shock loading device (21) comprises a combustible liquid supply part (211), a combustion-supporting gas supply part (212) and an ejection part (213);

the combustible liquid supply part (211) communicates with an input end of the ejection part (213), and inputs combustible liquid to the ejection part (213);

the combustion-supporting gas supply part (212) communicates with the input end of the ejection part (213), and inputs combustion-supporting gas to the ejection part (213);

the combustion-supporting gas is configured to support combustion of the combustible liquid; and an output end of the ejection part (213) is aligned with the turbine vane thermal barrier coating to be tested, and ejects burned high-temperature gas to the turbine vane thermal barrier coating to be tested.

4. The turbine vane thermal barrier coating working condition simulation experiment test system according to claim 3, wherein the erosion working condition loading device (22) comprises an erosion particle storage (221), a first precision powder feeder (222) and a second motor (223);

the erosion particle storage (221) stores erosion particles;

the first precision powder feeder (222) communicates with the erosion particle storage (221) and the ejection part (213), and conveys the erosion particles to the ejection part (213) to be mixed with the high-temperature gas;

the second motor (223) is electrically connected to the first precision powder feeder (222) to supply power to the first precision powder feeder (222); and the output end of the ejection part (213) is aligned with the turbine vane thermal barrier coating to be tested, and ejects mixed high-temperature gas to the turbine vane thermal barrier coating to be tested.

5. The turbine vane thermal barrier coating working condition simulation experiment test system according to claim 4, wherein the erosion working condition loading device (22) further comprises a first pipe (224), a first flow controller (225) and a first pressure regulating valve (226);

the first precision powder feeder (222) and the ejection part (213) communicate with each other through the first pipe (224); and the first pipe (224) is provided with the first flow controller (225) and the first pressure regulating valve (226) to respectively control conveying flow and pressure of the erosion particles.

6. The turbine vane thermal barrier coating working condition simulation experiment test system according to claim 3, wherein the corrosion working condition loading device (23) comprises a corrosion particle storage (231), a second precision powder feeder (232) and a third motor (233);

the corrosion particle storage (231) stores corrosion particles;

the second precision powder feeder (232) communicates with the corrosion particle storage (231) and the ejection part (213) respectively, and conveys the corrosion particles to the ejection part (213) to be mixed with the high-temperature gas;

the third motor (233) is electrically connected to the second precision powder feeder (232) to supply power to the second precision powder feeder (232); and the output end of the ejection part (213) is aligned with the turbine vane thermal barrier coating to be tested, and ejects the mixed high-temperature gas to the turbine vane thermal barrier coating to be tested.

7. The turbine vane thermal barrier coating working condition simulation experiment test system according to claim 6, wherein the corrosion working condition loading device (23) further comprises a second pipe (234), a second flow controller (235) and a second pressure regulating valve (236);

the second precision powder feeder (232) and the ejection part (213) communicate with each other through the second pipe (234); and the second pipe (234) is provided with the second flow controller (235) and the second pressure regulating valve (236) to respectively control conveying flow and pressure of the corrosion particles.

8. The turbine vane thermal barrier coating working condition simulation experiment test system according to claim 2, wherein the cooling working condition loading device (24) comprises an air compressor (241), an air heater (242) and a fourth motor (243);

the air compressor (241) communicates with the air heater (242), and inputs compressed air to the air heater (242);

the fourth motor (243) is electrically connected to the air heater (242) to supply power to the air heater (242); and the air heater (242) heats the air compressed by the air compressor (241), and inputs the same to high-temperature parts including the turbine vane thermal barrier coating to be tested and the ejection part (213).

9. The turbine vane thermal barrier coating working condition simulation experiment test system according to claim 8, wherein the air compressor (241) also communicates with the high-temperature thermal shock loading device (21) and provides combustion-supporting gas to the high-temperature thermal shock loading device (21).

10. The turbine vane thermal barrier coating working condition simulation experiment test system according to claim 8, wherein the load compressor (14) communicates with the air compressor (241) and outputs the absorbed energy to the air compressor (241).

11. The turbine vane thermal barrier coating working condition simulation experiment test system according to claim 8, wherein the load compressor (14) communicates with the high-temperature thermal shock loading device (21) and provides combustion-supporting gas to the high-temperature thermal shock loading device (21).

12. The turbine vane thermal barrier coating working condition simulation experiment test system according to claim 1, wherein the detection device (3) comprises:

a non-contact three-dimensional deformation test module (31) configured to perform real-time detection on a stress field, a strain field and a displacement field of the turbine vane thermal barrier coating to be tested;

a temperature test and collection module (32) configured to perform real-time test and collection on temperature of the turbine vane thermal barrier coating to be tested, temperature of the environment where the turbine vane thermal barrier coating to be tested is located and temperature of the service environment simulation device (2);

a high-speed Charge Coupled Device camera module (33) configured to photograph the working state of the turbine vane thermal barrier coating to be tested rotating at the high speed in the service environment;

an acoustic emission detection system module (34) configured to perform real-time detection on crack formation and initiation of the turbine vane thermal barrier coating to be tested under the high-speed rotation in the service environment;

an infrared detection system module (35) configured to perform real-time detection on interface delamination of the turbine vane thermal barrier coating under the high-speed rotation in the service environment; and a complex impedance spectroscopy test module (36) configured to perform real-time detection on interface oxidation and coating corrosion of the turbine barrier thermal barrier coating under test under the high-speed rotation in the service environment.

13. The turbine vane thermal barrier coating working condition simulation experiment test system according to any one of claims 1 and 2-11, further comprising an experiment console (4), wherein the working state simulation device (1), the service environment simulation device (2), the detection device (3) and the turbine vane thermal barrier coating to be tested are all provided on the experiment console (4).

* * * * *